(12) United States Patent
DeGarie

(10) Patent No.: US 6,497,533 B2
(45) Date of Patent: *Dec. 24, 2002

(54) DRAINAGE SYSTEM WITH MEMBRANE COVER AND METHOD FOR COVERING WASTEWATER RESERVOIR

(76) Inventor: Claude J. DeGarie, 1133 Regent St., Suite 300, Fredericton, New Brunswick (CA), E3B 3Z2

( * ) Notice: Subject to any disclaimer, the term of this patent is extended or adjusted under 35 U.S.C. 154(b) by 0 days.

This patent is subject to a terminal disclaimer.

(21) Appl. No.: 10/051,145

(22) Filed: Jan. 22, 2002

(65) Prior Publication Data

US 2002/0061229 A1 May 23, 2002

Related U.S. Application Data

(63) Continuation of application No. 09/713,295, filed on Nov. 16, 2000, now Pat. No. 6,357,964.

(51) Int. Cl.⁷ .......................... E02B 13/00; B65D 88/34
(52) U.S. Cl. ................ 405/52; 405/129.1; 405/129.57; 4/498; 4/499; 220/216; 220/219
(58) Field of Search .................... 405/52, 53, 129.1, 405/129.45, 129.6, 129.75, 129.9, 129.95, 129.57; 220/216, 218, 219; 4/498, 499, 500

(56) References Cited

U.S. PATENT DOCUMENTS

| 1,574,013 A | 2/1926 | Wiggins |
| 1,592,244 A | 7/1926 | Wiggins |
| 1,666,415 A | 4/1928 | Gallagher |
| 2,017,821 A | 10/1935 | Shanor .................... 220/26 |
| 2,071,530 A | 2/1937 | Howard et al. ............... 220/26 |
| 2,531,898 A | 11/1950 | Ulm .......................... 220/26 |
| 2,647,654 A | 8/1953 | Cibulka ..................... 220/26 |
| 3,313,443 A | 4/1967 | Dial et al. .................. 220/219 |
| 3,330,118 A | 7/1967 | Bias .......................... 405/53 |
| 3,683,428 A | 8/1972 | Morris ..................... 4/172.14 |
| 3,815,367 A | 6/1974 | Collins et al. ................. 61/1 |
| 3,933,628 A | 1/1976 | Varani ....................... 210/12 |
| 3,980,199 A | 9/1976 | Kays ......................... 220/227 |
| 3,991,900 A | 11/1976 | Burke et al. ................. 220/219 |

(List continued on next page.)

FOREIGN PATENT DOCUMENTS

| CA | 489428 | 1/1953 | |
| CA | 611666 | 1/1961 | |
| CA | 688536 | 6/1964 | |
| DE | 236427 | 7/1911 | |
| FR | 2639059 | * 5/1990 | .................... 4/498 |
| GB | 623853 | 5/1949 | |
| GB | 1457006 | 12/1976 | |
| GB | 2072649 | 10/1981 | |

OTHER PUBLICATIONS

Product Pamphlet Entitled: Horton Double–Deck Floating Roof "Bulletin B" Published By: Chicago Bridge & Iron Company Publication Date: 1947.

Primary Examiner—Jong-Suk (James) Lee
(74) Attorney, Agent, or Firm—Mario Theriault

(57) ABSTRACT

A membrane cover is mounted at the surface of a wastewater reservoir. The membrane cover has a flexible buoyant impermeable membrane affixed to the perimeter walls of the reservoir and loosely laid over the wastewater level inside the reservoir. An array of weight lines is anchored to the perimeter walls and is loosely laid over the impermeable membrane. The array of weight lines defines a rectangular herringbone pattern. An array of drains is also provided. Each drain is disposed along one of the lateral weight lines. The membrane cover also comprises an array of troughs formed therein under the array of weight lines. A water ballast having the continuous herringbone pattern is contained within the troughs. Because of this water ballast, the membrane cover is kept taut and stable during a rainstorm and a surface thereof exposed to uplifting wind forces is minimized.

1 Claim, 4 Drawing Sheets

U.S. PATENT DOCUMENTS

| | | | |
|---|---|---|---|
| 4,000,527 A | 1/1977 | Gannon | 4/172.12 |
| 4,122,561 A | 10/1978 | Barr | 4/172.12 |
| 4,130,217 A | 12/1978 | Hills et al. | 220/226 |
| 4,139,117 A | 2/1979 | Dial | 220/218 |
| RE30,146 E | 11/1979 | Dial | 220/219 |
| 4,181,986 A | 1/1980 | Aine | 4/172.14 |
| 4,192,025 A | 3/1980 | Hinsperger | 4/172.14 |
| 4,201,663 A | 5/1980 | Rollag et al. | 210/16 |
| 4,208,469 A | 6/1980 | Dial | 428/315 |
| 4,230,580 A | 10/1980 | Dodson | 210/170 |
| 4,438,863 A | 3/1984 | Wilson et al. | 220/227 |
| 4,446,983 A | 5/1984 | Gerber | 220/219 |
| 4,476,992 A * | 10/1984 | Gerber | 220/219 |
| 4,503,988 A | 3/1985 | Gerber | 220/219 |
| 4,555,820 A * | 12/1985 | Dragstrem | 4/256 |
| 4,565,468 A | 1/1986 | Crawford | 405/270 |
| 4,601,072 A | 7/1986 | Aine | 4/499 |
| 4,603,790 A | 8/1986 | Gerber | 220/219 |
| 4,672,691 A | 6/1987 | DeGarie et al. | 4/499 |
| 4,972,529 A | 11/1990 | Wolfson et al. | 4/500 |
| 5,119,849 A * | 6/1992 | Hinkley | 134/104.1 |
| 5,505,848 A | 4/1996 | Landine et al. | 210/170 |
| 5,587,080 A | 12/1996 | Landine et al. | 210/603 |
| 5,802,629 A | 9/1998 | Zietek | 4/498 |
| 5,946,743 A | 9/1999 | Hashmi | 4/498 |
| 5,970,531 A * | 10/1999 | Demby | 4/498 |
| 6,052,843 A * | 4/2000 | Pirillo | 4/498 |
| 6,119,284 A | 9/2000 | Cosman | 4/498 |
| 6,193,092 B1 | 2/2001 | Witter | 220/218 |
| 6,193,879 B1 * | 2/2001 | Bowman | 210/153 |
| 6,260,217 B1 | 7/2001 | Loft, Jr. | 4/498 |
| 6,338,169 B1 | 1/2002 | De Garie | 4/498 |
| 6,357,964 B1 * | 3/2002 | DeGrarie | 405/52 |

* cited by examiner

DRAINAGE SYSTEM WITH MEMBRANE COVER AND METHOD FOR COVERING WASTEWATER RESERVOIR

This is a continuation of U.S. patent application Ser. No. 09/713,295 filed on Nov. 16, 2000, now U.S. Pat. No. 6,357,964.

FIELD OF THE INVENTION

This invention pertains to drainage systems for flexible floating covers covering large wastewater reservoirs, and particularly it relates to a drainage system for accumulating rainwater on a membrane cover in a controlled manner and for draining excess rainwater into the wastewater reservoir.

BACKGROUND OF THE INVENTION

Membrane covers are mounted over settling ponds, clarifiers and other wastewater reservoirs to contain and collect fermentation gases of mill effluent for example. The maintenance of a membrane cover floating on a large wastewater reservoir represents certain difficulties in that the cover is exposed to the elements and to the movement of the liquid under the cover. For example, a slight accumulation of rainwater over a cover tends to create puddles, mounds and relaxed segments at random locations on the cover. These puddles, mounds and especially the relaxed segments catch the wind and promote waves along the cover and into the liquid under the cover. The movement of liquid under the cover causes tangential stresses and constant movement in the membrane cover itself. These movements and stresses could cause fatigue, localized elongation and rupture of the cover. The formation of mounds, puddles and relaxed segments on a membrane cover is amplified where the content of the covered reservoir contains gases or is able to generate gases that tend to create gas pockets at the surface of the wastewater under the membrane cover.

Although the formation of rainwater puddles and mounds over a floating cover is a natural phenomenon that will remain an inherent characteristic of a flexible membrane cover, it will be appreciated from the following disclosure that there are numerous advantages which can be derived from an accumulation of rainwater over a floating membrane cover when the accumulation and drainage of rainwater are effected in a controlled manner.

It is believed that the prior art is short on suggestion with regards to a drainage system to advantageously control the accumulation of rainwater on a membrane cover. Examples of the drainage systems of the prior art for floating covers are described in the following documents:

U.S. Pat. No. 2,531,898, issued on Nov. 28, 1950 to R. C. Ulm, discloses a floating roof with a flexible deck and a central weight mounted on the deck. The central weight causes the deck to curve downward such that rainwater flows downward toward the central weight. Rainwater is evacuated through a drain at the centre of the weight and through a hose extending from the drain.

U.S. Pat. No. 4,672,691, issued on Jun. 16, 1987 to DeGarie et al. discloses a flexible membrane cover having weight lines thereon to promote the accumulation of rainwater under the weight lines. Rainwater is evacuated by evaporation or by the use of sump pumps placed directly on the membrane cover.

U.S. Pat. No. 5,946,743, issued on Sept. 7, 1999 to I. S. Hashmi, discloses a pool cover having a drain hole at the centre thereof. A flexible conduit extending from the drain pipe carries rainwater outside the pool.

Although the drainage systems of the prior art deserve undeniable merit, there is no known prior art that discloses, teaches or suggests a drainage system to control the accumulation of rainwater on a membrane cover such that the cover is less susceptible of being exposed to destructive stresses from wind-induced liquid movement under the cover.

SUMMARY OF THE INVENTION

In the present invention, there is provided a membrane cover and a drainage system therefor whereby rainwater is quickly accumulated during the early stages of a rainstorm to provide a water ballast on the membrane cover to keep the cover taut and to limit the formation of randomly spaced puddles, mounds and relaxed segments that can deform the cover and create destructive stresses in the cover structure.

In a first aspect of the present invention there is provided a wastewater reservoir having a membrane cover mounted thereon. The membrane cover has a flexible buoyant impermeable membrane affixed to the perimeter walls of the reservoir and loosely laid over the wastewater level inside the reservoir. An array of weight lines is anchored to the perimeter walls of the reservoir and is loosely laid over the impermeable membrane. The array of weight lines comprises a longitudinal weight line and a plurality of spaced-apart lateral weight lines extending perpendicularly from the longitudinal weight line on both sides of the longitudinal weight line. An array of drains is also provided. Each drain is disposed along one of the lateral weight lines and extends through the impermeable membrane. The membrane cover according to the present invention also comprises an array of troughs formed therein under the array of weight lines. The troughs are connected to each other. A water ballast is contained within the connected troughs and a level of water in this water ballast is controlled by the drains. The water ballast defines a herringbone pattern extending over a major portion of the cover.

A first advantage of the membrane cover having the water ballast thereon is that is the cover is kept taut and stable during a rainstorm and a surface thereof exposed to uplifting wind forces is minimized.

In another aspect of the present invention, the membrane cover comprises a flexible buoyant layer affixed to the perimeter walls of the reservoir and loosely laid over the wastewater level inside the reservoir. The impermeable membrane is also affixed to the perimeter walls and is loosely laid over the flexible buoyant layer. In this aspect of the invention, the membrane cover has a substantial thickness. Each drain has a straight pipe extending above the upper surface of the membrane cover for accumulating a level of rainwater in each trough and for maintaining a water connection between the troughs. The drains are located in a one-quarter portion of the width of the cover nearest one of the perimeter walls.

The water ballast contained in the troughs is advantageous for its expanse and shape. The water ballast covers a major area of the membrane cover without having large cross dimension exposed to up-lifting wind forces. Because of the drains, the water ballast remains present on the impermeable membrane for extended period of time following a rainstorm.

In a further aspect of the present invention, the thickness of the membrane cover cooperates with the drains to maintain the level of the water ballast higher than the level of wastewater inside the reservoir, for draining rainwater in excess of the effective level of the water ballast.

Another advantage of the structure of the membrane cover is that the flexible buoyant layer, the impermeable membrane and the array of weight lines constitute three separate layers that are loosely laid over each other. These three separate layers are therefore free to slide upon each other and flex to follow the movement of the wastewater inside the reservoir without generating any destructive tangential stress in the membrane cover.

In another feature of the present invention the membrane cover further has an array of ridges formed thereon each of which being disposed between two of the lateral weight lines. These ridges are advantageous for offering gas passages to evacuate off-gases that are often generated by the wastewater inside the reservoir.

Other advantages and novel features of the present invention will become apparent from the following detailed description.

BRIEF DESCRIPTION OF THE DRAWINGS

An embodiment of the present invention is illustrated in the accompanying drawings, in which like numerals denote like parts throughout the several views, and in which.

DETAILED DESCRIPTION OF THE PREFERRED EMBODIMENT

Figure 1:
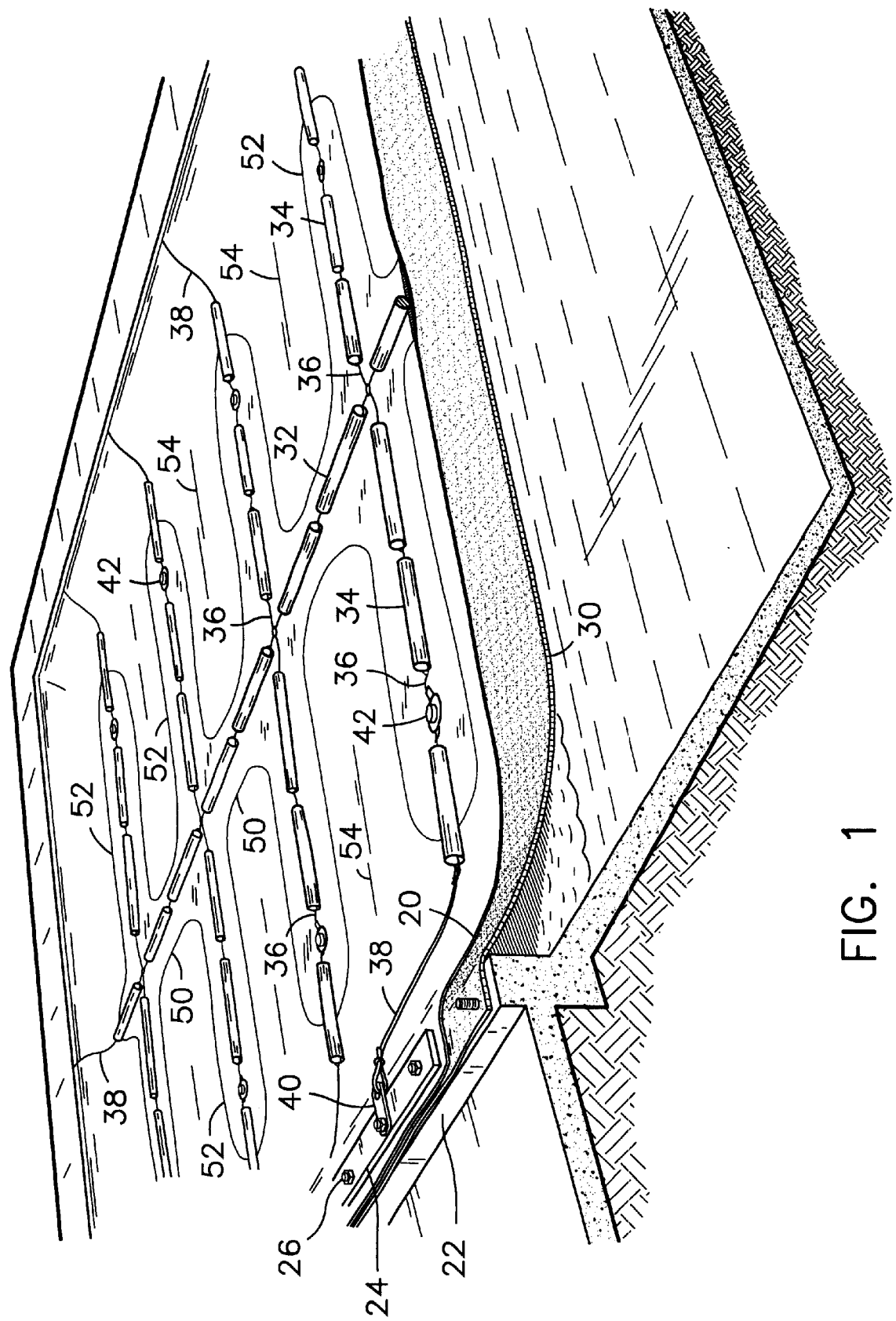
FIG. 1 is a partial perspective view of a membrane cover and drainage system therefor according to a preferred embodiment of the present invention installed over a wastewater reservoir.

While this invention is susceptible of embodiments in many different forms, there is shown in the drawings and will be described in details herein one specific embodiment of the present invention, with the understanding that the present disclosure is to be considered as an example of the principles of the invention and is not intended to limit the invention to the embodiment illustrated and described.

A preferred embodiment of the membrane cover and the drainage system therefor according to the present invention is partly illustrated in the accompanying drawings. These partial drawings are provided herein for clarity. These drawings are believed to be sufficient for illustrating the concept and principles of the present invention. Numerous other structural details or variations may be included in a complete cover installation. However, these additional structural details and variations are known to those skilled in the art. The membrane cover and drainage system therefor according to the present invention is an improvement over the floating membrane cover described in U.S. Pat. No. 4,672,691 of which the first named inventor is also the inventor of the present invention.

The membrane cover according to the preferred embodiment comprises a flexible water-impermeable membrane 20 which is anchored to the perimeter walls 22 of a wastewater reservoir. A flat bar 24 and a series of anchor bolts 26 are used for clamping the impermeable membrane 20 to the top edge of the walls 22. The impermeable membrane 20 has sufficient surface to cover the reservoir at its lowest operating level. The flexible impermeable membrane 20 is preferably made of a stretch-resistant nylon-based pliable sheet material.

The impermeable membrane 20 is loosely supported at the surface of the reservoir by a flexible buoyant layer 30. The flexible buoyant layer 30 is preferably made of a semi-rigid, closed-cell, water-impermeable insulating foam or other semi-rigid low density insulating foam such as polyethylene foam for example. For convenience, the flexible buoyant layer is hereinafter referred to as the foam layer 30.

The foam layer 30 is also loosely laid at the surface of the wastewater inside the reservoir and is anchored to the perimeter walls 22 with the impermeable membrane 20. The impermeable membrane 20 and the foam layer 30 are not attached to each other except at the perimeter of the reservoir and at the drain holes, as will be explained later. The impermeable membrane 20 and the foam layer 30 are thereby free to slide upon each other to increase the flexibility of the membrane cover such that the membrane cover can follow the movements of the waves in the wastewater of the reservoir without generating any tangential stress therein.

The membrane cover according to the preferred embodiment also comprises a longitudinal weight line 32 and an array of lateral weight lines 34 laid over the impermeable membrane 20. The longitudinal weight line 32 extends along a longitudinal median of the membrane cover. The lateral weight lines 34 are equally spaced-apart and extend at right angle from the longitudinal weight line 32. The longitudinal and lateral weight lines 32, 34 jointly define a herringbone pattern of weight lines.

The longitudinal and lateral weight lines 32, 34 are made of a plurality of pipe sections filled with sand or concrete for example. The pipe sections in the longitudinal and lateral weight lines 32, 34 are linked to each other by rope 36 or light cable, such that each weight line is longitudinally flexible to follow the movement of the membrane cover with any wave action in the covered liquid. The outside end of each weight line 32, 34 is anchored to the perimeter walls 22 of the reservoir by means of anchor cables 38 attached to anchor tabs 40 mounted to some of the anchor bolts 26 above the membrane clamping flat bar 24. The rope 36 of a weight line 34 above a drain 42 is preferably attached to the drain 42, to retain the weight line to that drain. Because the weight lines 32, 34 are relatively flexible, their movements relative to the impermeable membrane 20 do not apply any significant concentrated shear stress on the impermeable membrane.

A first function of the longitudinal and lateral weight lines 32, 34 is to cause longitudinal and lateral depressions along the surface of the cover to accumulate rainwater on the membrane cover according to a specific pattern. During a rainstorm, the accumulation of rainwater forms a water ballast over the membrane cover to stabilize the cover and to prevent excessive wind-induced movement in the membrane cover. The membrane cover is thereby kept taut and the surface of the impermeable membrane 20 exposed to uplifting wind forces is reduced.

The preferred water ballast comprises a central segment 50 which extends along the longitudinal weight line 32 and a plurality of spaced-apart lateral segments 52 respectively extending under one of the lateral weight lines 34. The central segment 50 and lateral segments 52 of the water ballast also define a herringbone pattern which is better illustrated in FIG. 2. It has been found that a water ballast having the illustrated herringbone pattern is more effective than other patterns in stabilizing a membrane cover in periods of high winds during or after a rainstorm for example. The expanse of this pattern covers a major portion of the cover without exposing large cross dimension to the wind forces and to the formation of wave at the surface of the water ballast.

In order to maintain a stabilizing effect on the membrane cover, it is important that a water connection is maintained between the lateral segments 52 and the central segment 50 of the water ballast. It is also important to maintain the integrity of the central segment and of each lateral segment. If water connection is broken along one segment, the membrane surface at that location is relaxed from its preferred stretched mode. A gas pocket may form at that location under the cover and cause the formation of a mound. A mound or a relaxed segment in a membrane cover is known to catch the wind and cause a water connection in another segment to break and form another mound, and so on. Therefore, a broken water connection can entrain the formation of a number of randomly-spaced mounds, puddles and relaxed segments, and the associated undesired movements of the wastewater under the membrane cover.

As will be explained, the water connections between and along the lateral segments 52 and the central segment 50 are maintained by a series of drains 42 through the impermeable membrane 20 and the foam layer 30.

Figure 2:
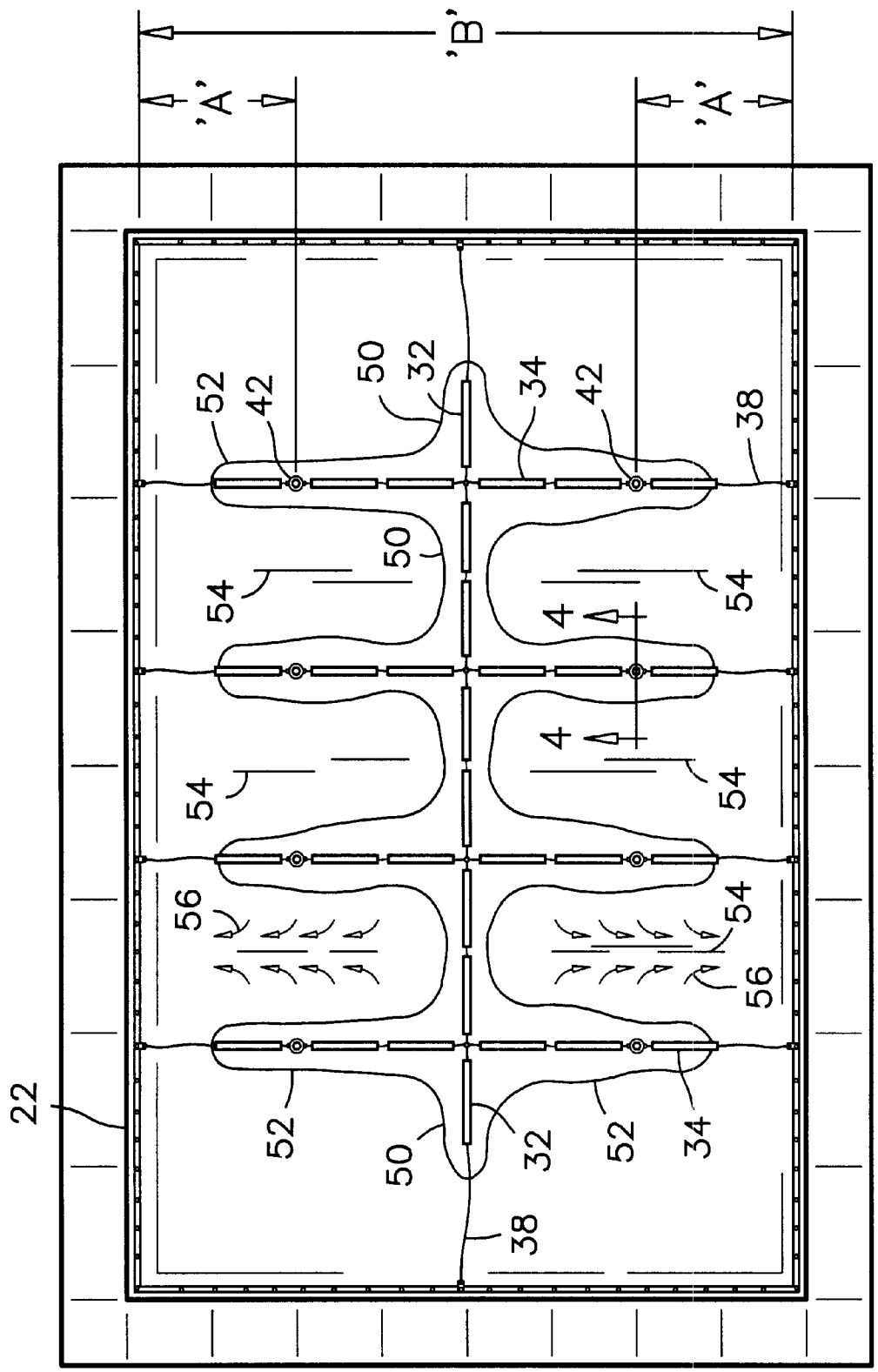
FIG. 2 is a top view of the wastewater reservoir having the membrane cover installed thereon.

Still referring to FIG. 2, the drains 42 are preferably located along the lateral weight lines 34 at a distance 'A' of about one quarter of the full width 'B' of the reservoir, measured from each side of the reservoir. The structure and position of the drains 42 in the side portions of the floating membrane cover are also advantageous for maintaining a water connection along the water ballast segments 50, 52 especially in installations where scum tend to accumulate at the centre of the membrane cover.

The foam layer 30 causes the formation of ridges 54 between the lateral weight lines 34. These ridges 54 offer gas passages under the membrane cover whereby any off-gases generated by the content of the reservoir can be evacuated along the ridges 54 and toward the perimeter walls 22 of the reservoir, such as illustrated by arrows 56.

The combination of the foam layer 30 and the water ballast 50, 52 having the herringbone pattern are advantageous for creating the ridges 54 while maintaining the entire membrane cover under tension. The formation of a ridge 54 between two lateral segments 52 of the water ballast is advantageous for providing a means to evacuate off-gases from under the membrane cover without causing any relaxed segment in the cover. On the other hand, the presence of ridges 54 on the membrane cover helps to accumulate rainwater in the water ballast and to confine the water ballast to the illustrated herringbone shape. The membrane cover is therefor held under tension by both the water ballast and the ridges, as both the buoyancy of the foam layer at the ridges and the weight of the water ballast between the ridges act in opposite directions. Because the ridges are under tension, the wind forces on the ridges 54 have minimal effect on the movements of the wastewater under the cover. Because of the relatively narrow segments 50, 52 of the water ballast, the wind forces on the water ballast also have minimum effect on the formation of waves in the water ballast.

Figure 3:
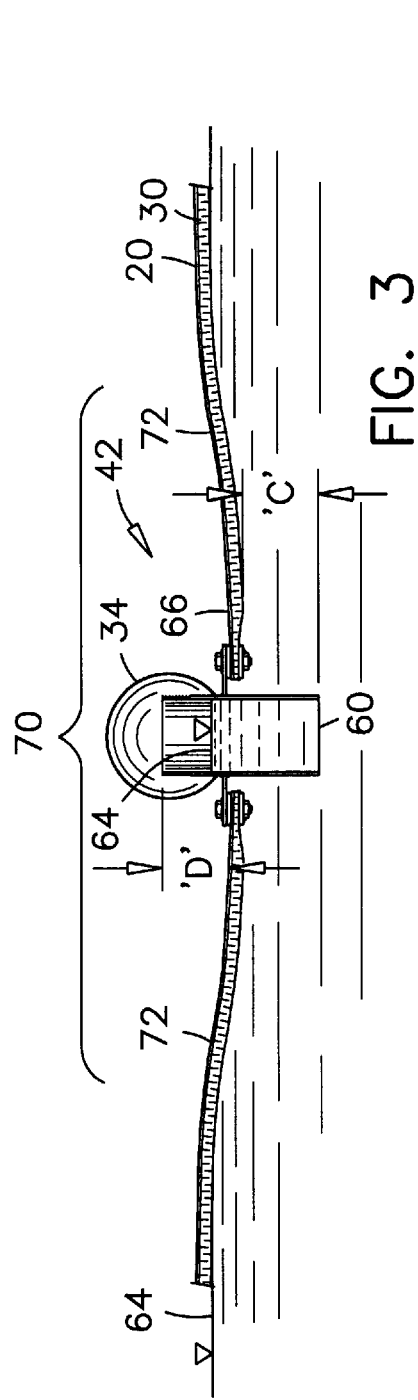
FIG. 3 illustrates a cross-section view of one of the drains through the membrane cover, shown without any accumulation of rainwater over the membrane cover.
Figure 4:
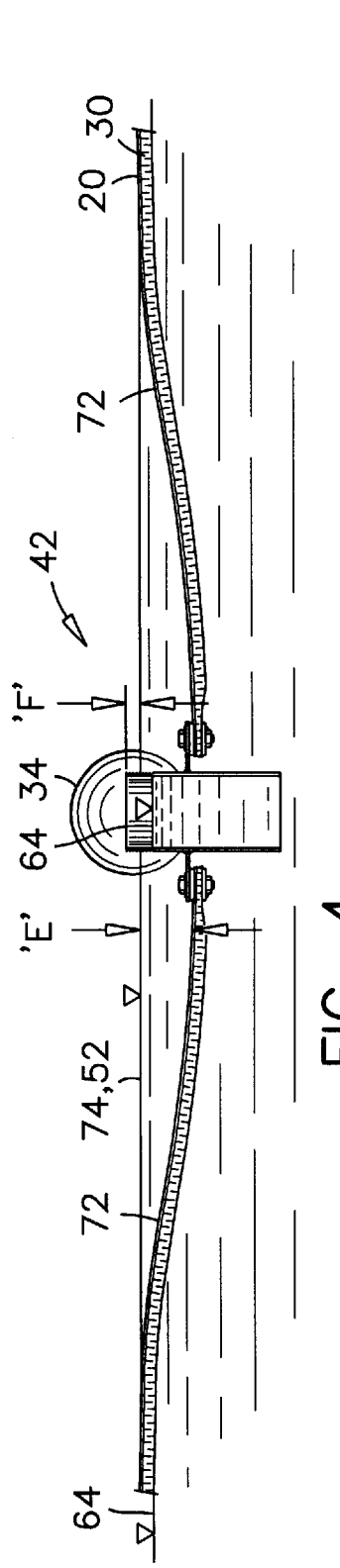
FIG. 4 illustrates a second cross-section view of a drain in the membrane cover, as seen along line 4—4 in FIG. 2 and showing an equilibrium volume of rainwater on the membrane cover.
Figure 5:
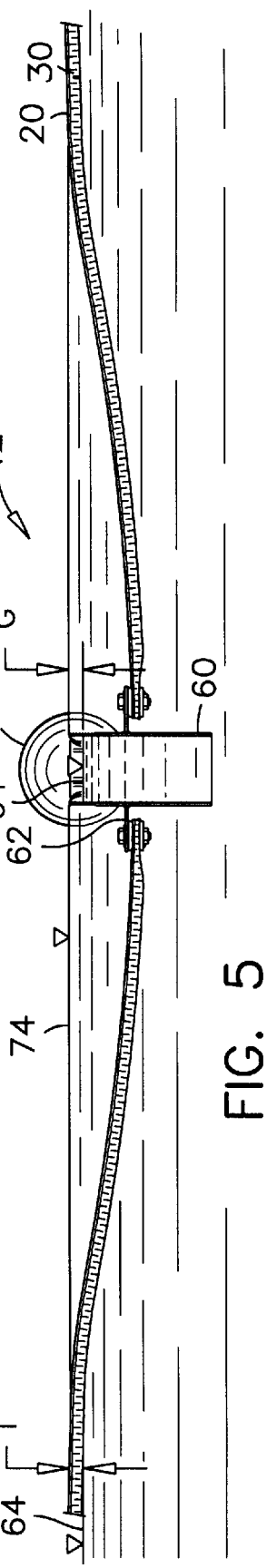
FIG. 5 illustrates a third cross-section view of the drain, shown during the evacuation of excess rainwater from the membrane cover.

Referring now to FIGS. 3–5, the operation of the drains 42 will be explained in details. Each drain 42 consists of a straight pipe 60 having a flange 62 affixed to the impermeable membrane 20 and to the foam layer 30. The straight pipe 60 extends under the foam layer 30 a distance 'C' which is more than the thickness of the scum layer that is expected to form under the membrane cover. The dimension 'C' is defined from experience with similar covered liquids. Most commonly, the dimension 'C' is between about six inches and about twelve inches.

The straight pipe 60 extends above the impermeable membrane 20 a distance 'D' which consists of an equilibrium dimension 'E' and a precautionary dimension 'F'. In a large membrane cover having few to several acres in surface for example, the equilibrium dimension 'E' may be between about one and about two inches. However, for greater certainty, the equilibrium dimension 'E' is preferably defined according to the following method at every new cover installation.

a) On an installed cover, all the drain holes are cut out at the dimensions 'A' along the lateral weight lines 34.

b) The portions of the cover under the weight lines 32, 34, are allowed to sink below the level of wastewater inside the reservoir, to partly submerge the weight lines 32, 34 in backwater and to establish a water connection above the cover and along the weight lines 32, 34.

c) The weight of the weight lines 32, 34 may be increased or decreased to clearly define the water ballast 50, 52 having a continuous herringbone pattern as mentioned before.

d) When equilibrium has been reached and that the continuity of the water ballast is clearly defined, the depth of the backwater above the impermeable membrane 20 at one of the drain holes is measured. This depth of backwater above the impermeable membrane at the equilibrium state corresponds to the equilibrium dimension 'E'.

e) The straight pipe 60 of each drain 42 is then trimmed to the corresponding dimension 'D'.

f) The drains 42 are affixed to the cover and the backwater is pumped under the cover.

During a rainstorm, the equilibrium dimension 'E' contributes to quickly accumulate a water ballast on the membrane cover in the early stages of a rainstorm to stabilize the membrane cover during and after the rainstorm. The equilibrium dimension 'E' constitutes an equilibrium state where a water connection is reliably maintained between the central segment 50 and the lateral segments 52 of the water ballast.

Although the above method makes use of backwater to define an equilibrium dimension 'E', it will be appreciated that the equilibrium dimension can also be defined using rainwater during a rainstorm for example or using freshwater from another source. In these latter cases, the step of pumping backwater under the cover can be eliminated as the water ballast is preferably left on the membrane cover to slowly evaporate.

In FIG. 3 there is illustrated a cross-section view of the membrane cover in a dry state, that is when rainwater has evaporated from its upper surface. In this state, the wastewater level 64 inside the reservoir is preferably slightly higher than the surface 66 of the impermeable membrane immediately under the weight line 34.

The weight lines 32, 34 and the flexibility of the membrane cover cause the membrane cover to slope outwardly upward from each weight line 32, 34 to form an array of troughs 70 each having sloping sides 72. The troughs 70 are connected to each other, and the array of troughs 70 also has the aforesaid herringbone pattern. The sloping sides 72 and the ridges 54 mentioned before cooperate to accumulate rainwater in the connected troughs 70 to create the preferred water ballast 50, 52.

The purpose of the precautionary dimension 'F' mentioned before is to prevent drainage of the water ballast from the equilibrium state, as shown in FIG. 4, which could be caused by waves at the water surface or by wind-induced movements in the membrane cover. For membrane covers having one acre or more in size, the preferred dimension 'F' is about one-half inch.

As rainwater accumulates in the troughs 70, the level 74 of the water ballast 50, 52 above the impermeable membrane 20 tends to remain higher than the wastewater level 64 under the membrane cover. It has been found that the difference 'G' between the two levels is similar to or slightly more than the thickness 'T' of the membrane cover. It is believed that the difference 'G' between the two levels can be slightly larger than the dimension 'T' due to the additional buoyancy provided by the off-gases, excess scum or other floating particles accumulating at the ridges 54. In the preferred embodiment, the thickness 'T' of the membrane cover is between about one-half inch to about three-quarter of an inch. Therefore, as rainwater accumulates over the membrane cover, the excess water flows over the drain pipe 60 and is efficiently drained down into the covered liquid, as illustrated in FIG. 5.

Figure 6:
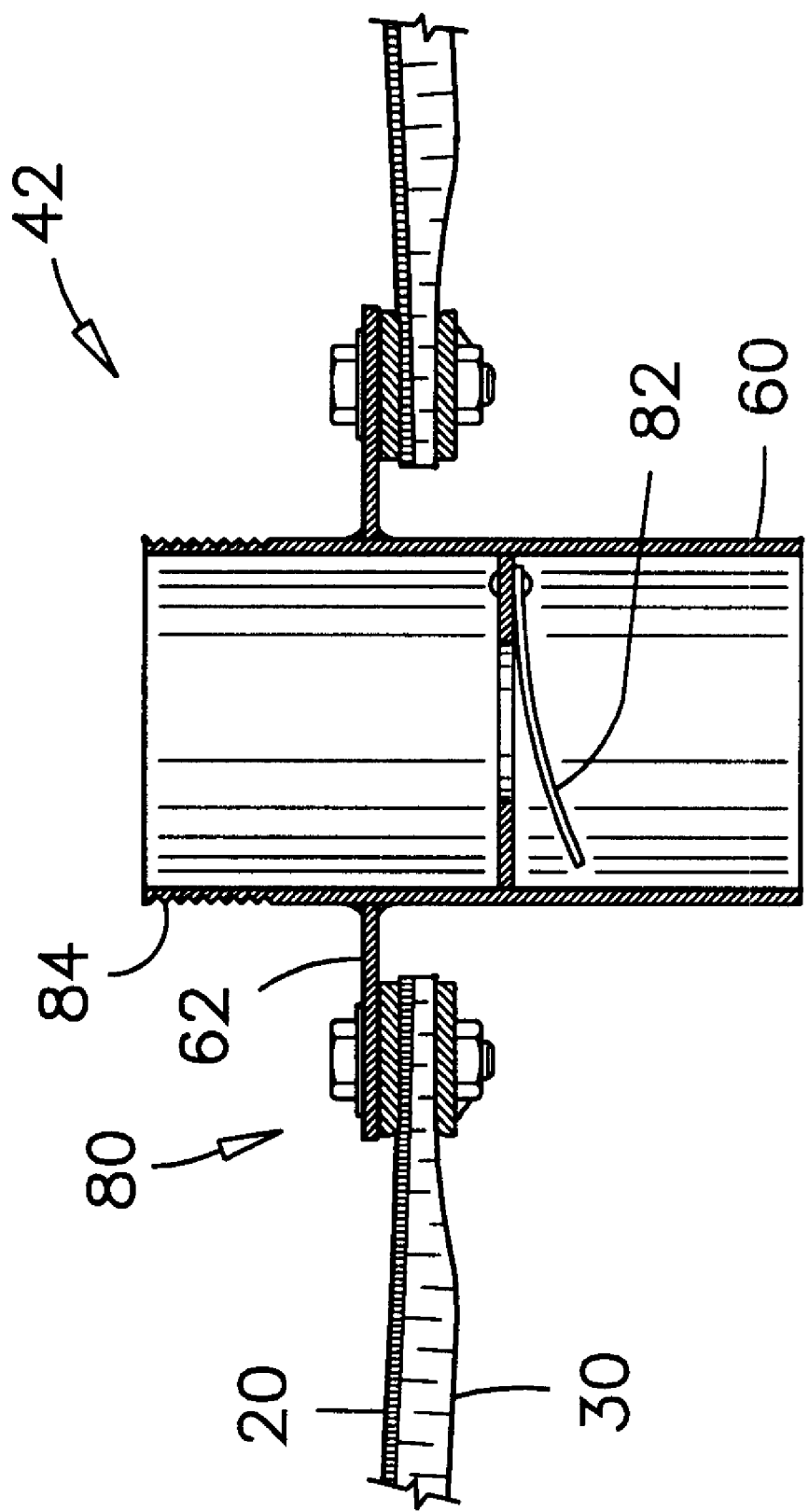
FIG. 6 shows an enlarged cross-section view of the drain having an optional flap valve mounted therein.

Referring now to FIG. 6, the flange 62 of a drain 42 is affixed to the impermeable membrane 20 and to the foam layer 30 to form an impermeable joint 80 with the membrane cover. In the preferred embodiment, this impermeable joint 80 is a bolted assembly of gaskets and annular plates.

In applications where the covered wastewater does not contain floating greases or similar scum, a flap valve 82 may be mounted inside the straight pipe 60. The flap valve 82 is advantageous for preventing a back flow of wastewater through the drain 42 when a person walks near the drain 42, for inspecting the membrane cover for example. The straight pipe 60 also has a threaded portion 84 on its upper end for receiving a pipe coupling and extension (not shown) or a pipe cap (not shown) for adjusting the equilibrium dimension mentioned before or for performing repair work on the cover for example.

It will also be appreciated that the foam layer 30 can be omitted from the structure of the membrane cover in installations where grease or other buoyant scum accumulates at the surface of the wastewater.

While one embodiment of the present invention has been illustrated in the accompanying drawings and described hereinabove, it will be appreciated by those skilled in the art that various modifications, alternate constructions and equivalents may be employed without departing from the true spirit and scope of the invention. Therefore, the above description and the illustrations should not be construed as limiting the scope of the invention which is defined by the appended claims.

I claim:

1. In combination, a wastewater reservoir and a membrane cover mounted over said wastewater reservoir; said wastewater reservoir having a wastewater level and perimeter walls, and said membrane cover comprising:

a flexible buoyant impermeable membrane affixed to said perimeter walls and loosely laid over said wastewater level;

an array of interconnected weight lines anchored to said perimeter walls and loosely laid over said impermeable membrane, said array of weight lines comprising lateral weight lines extending substantially perpendicular to at least one of said perimeter walls;

an array of drains, each of which being disposed along at least one of said lateral weight lines and extending into the wastewater through said impermeable membrane;

an array of interconnected troughs formed therein under said array of weight lines; and a water ballast contained in said troughs; such that said membrane cover is kept taut and stable.

* * * * *